J. M. C. HERRGOTT.
ELECTROMECHANICAL REGULATOR FOR ELECTRIC TENSION.
APPLICATION FILED APR. 27, 1906.
901,613.
Patented Oct. 20, 1908.
3 SHEETS—SHEET 3.
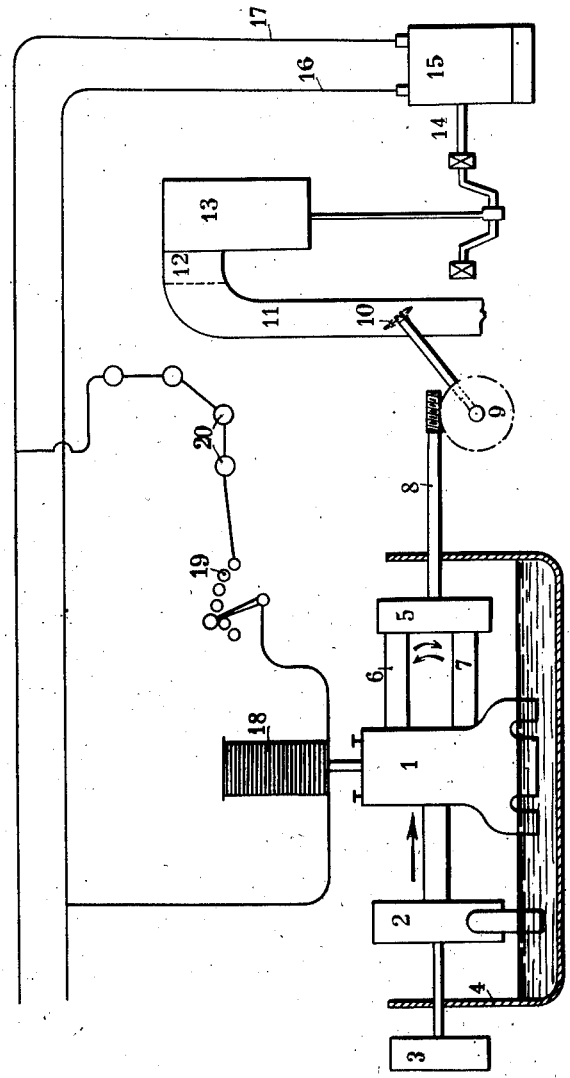
WITNESSES
W. P. Burke
W. H. Kennedy
INVENTOR
Joseph Michel Camille Herrgott
BY Richardo
ATTY.

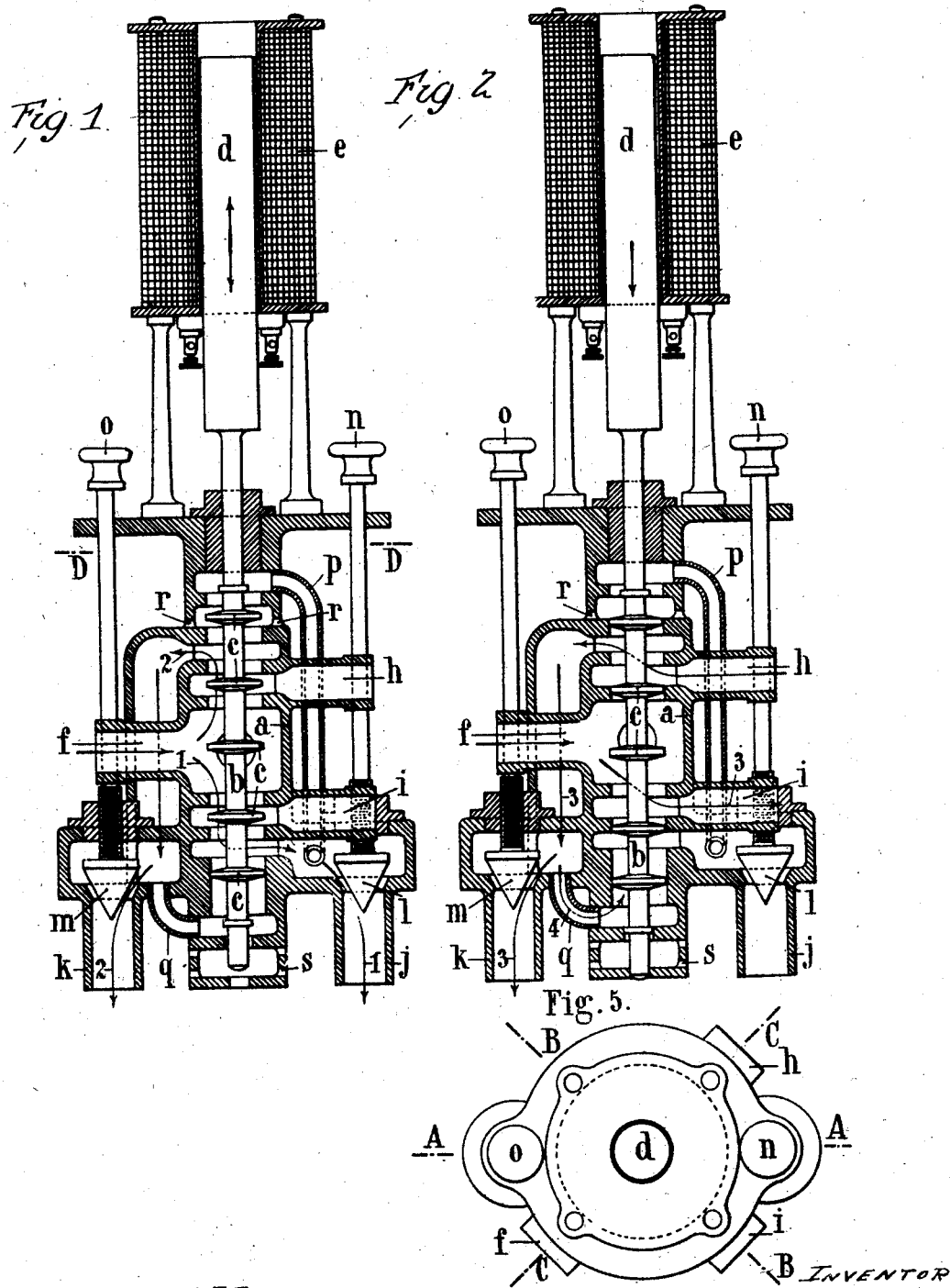

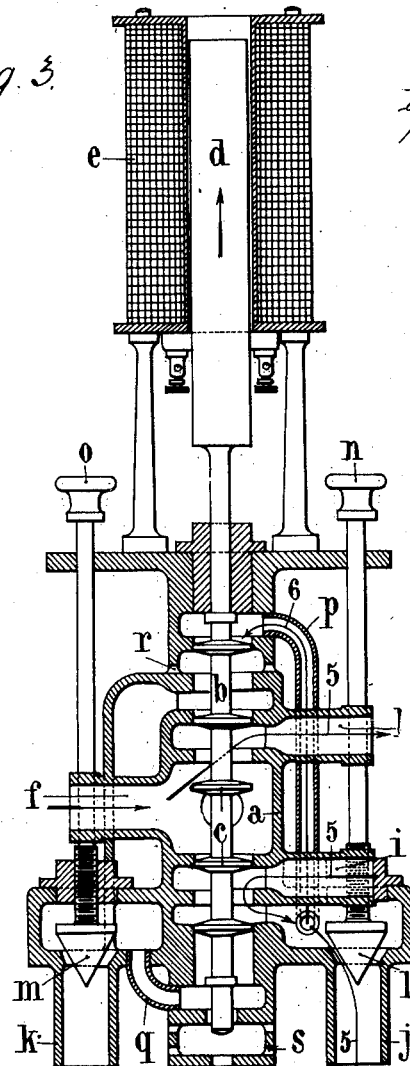
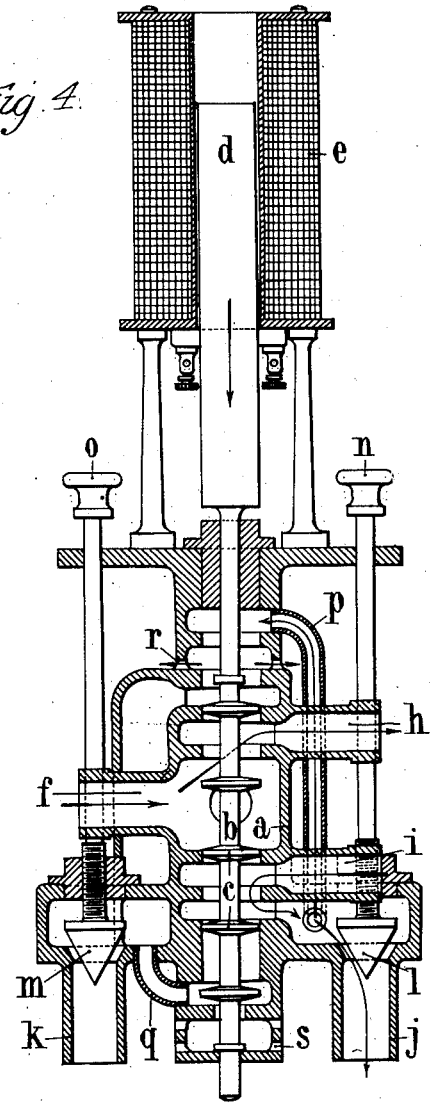
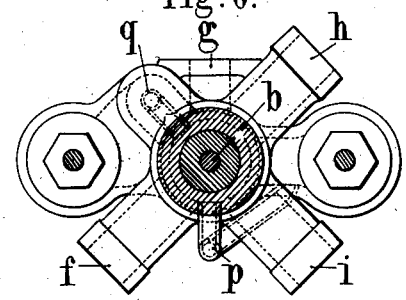

UNITED STATES PATENT OFFICE.

JOSEPH MICHEL CAMILLE HERRGOTT, OF VALDOIE, FRANCE.

ELECTROMECHANICAL REGULATOR FOR ELECTRIC TENSION.

No. 901,613.   Specification of Letters Patent.   Patented Oct. 20, 1908.

Application filed April 27, 1906. Serial No. 314,307.

*To all whom it may concern:*

Be it known that I, JOSEPH MICHEL CAMILLE HERRGOTT, of Villa de la Sallière, at Valdoie, Territory of Belfort, Republic of France, engineer, have invented Electromechanical Regulators of Electric Tension, of which the following is a full, clear, and exact description.

The present invention has for its object an electro-mechanical regulator of electric tension, for the purpose of regulating the tension of an electric current furnished by a dynamo generator, by acting upon the distribution of the motive force employed whether water, gas, steam, internal combustion or electric motors.

This regulator consists in principle of a valve rod operated directly by electricity which can assume four positions corresponding with the four following cases: 1st dead point when the tension has its normal value; 2nd it accelerates the speed of the motor when the tension lowers; 3rd it reduces the speed of the motor when the tension rises; 4th it arrests the motor in case of absence of electric current. This action of the valve rod upon the distribution is immediate without any loss of the motor force employed. It maintains constant the speed of a motor of any character by acting on its distribution by the aid of a small auxiliary dynamo when it is not used in connection with an electric plant.

Beyond its action, which is as immediate as that of the main electric current, this regulator by a regulation effected in position and without previous calculations, enables to take into consideration the inertia of masses in motion in order to avoid oscillations around the point of regulation.

As an example, this invention is represented in the accompanying drawing in which:

Figures 1, 2, 3 and 4 are at their lower parts vertical sections on the line A—A of the plan and at their intermediate parts are vertical sections on the lines B—B and C—C of this plan; these sections show the four positions of the valve rod. Fig. 5 is a plan of the same and Fig. 6 is a horizontal section on the line D—D of Fig. 1. Fig. 7 is a diagrammatical view of the whole apparatus.

In Fig. 7 1 represents the regulator immersed in a closed reservoir 4 filled with oil; a pump 2 operated by a pulley 3 draws the oil from this reservoir and conveys it into the regulator. This oil by one of the pipes 6 or 7 reaches a servomotor (or steam steering engine) 5 and returns to the regulator by the other pipe. The servomotor controls by a rod 8 a toothed wheel 9 the valve 10 placed on the inlet pipe 11 of the distribution 12 of a motor 13. To the shaft 14 of this motor is coupled the shaft of the dynamo 15 whence the wires 16 and 17 carrying the current to be regulated lead. The solenoid 18 is placed in a shunt taken from these wires 16 and 17. In this shunt are placed the rheostat 19 and the circuit breakers 20.

As shown in the drawing, the regulator is composed of a valve box $a$ with vertical axis, formed with a series of appropriate stages, and of valve rod $b$ provided with a number of equilibrated valves $c$; this rod forms part of a core $d$ movable within a fixed solenoid $e$ the vertical axis of which coincides with that of the valve box, this solenoid $e$ is in derivation from the main electric current.

The valve box receives a liquid pressure which enters through the tubular connection $f$ and is generally of oil obtained by piston or rotary pump or accumulator, generally driven by the motor to be regulated. Through tubular connection $h$ the liquid under pressure is delivered to a double acting piston pump or to a rotary pump to act upon the distribution of the motor and reduce its speed by closing it. Similarly through the tubular connection $i$ the liquid is delivered to act in reverse direction and increase the speed of the motor by opening its distribution. When one of these actions is produced, the corresponding escape of the liquid which has acted is made through the other tubular connection $i$ or $h$ in reverse direction to leave by the auxiliary tubular connections $j$ or $k$ by passing the regulable valves $l$ or $m$ in the direction of the arrows 1, 2. The opening of the valves $l$ or $m$ is regulated by acting upon the knobs $n$, $o$. The tubes $p$, $q$ connect the ends of the valve box with the chambers of the regulable valves $l$, $m$. The sides of this valve box are provided with small orifices $r$ and $s$.

The working of the regulator is as follows: 1st. Suppose the electric tension at its normal value; the solenoid in derivation $e$ holds in equilibrium its core $d$ and consequently the valve rod at the dead point, see Fig. 1. The liquid pressure arriving at $f$ escapes by the tubular connections $j$ and $k$ and produces no action in the tubular connections $h$ and $i$ nor in the tubes $p$ and $q$.

2nd. Suppose the electric tension lowers (see Fig. 2), the solenoid $e$ no longer sufficiently attracts its core $d$ which descends slightly with the valve rod; the liquid pressure arriving at $f$ then passes into $i$, as indicated by arrow 3, acts to open the distribution of the motor and returns through the tubular connection $h$ and outlet $k$ to flow away after having fulfilled its purpose to accelerate the speed of the motor. Nevertheless if the corresponding valve $m$ is slightly closed by turning the knob $o$ there is produced in this outlet a small counterpressure which through the pipe $q$ is transmitted to the lower part of the valve rod as indicated by the arrow 4; this counter pressure slightly destroys the equilibrium of the valve rod and tends to raise it by thus acting contrarily to the solenoid $e$ which allowed it to descend; if this counter pressure becomes the stronger, the valve rod remounts under its action to the dead point and the liquid escapes; by this fact the counterpressure becomes naught and the solenoid $e$ allows its core $d$ to re-descend; there are thus produced a series of intermissions which effect the regulation, by taking count, of the force of inertia of the masses in movement according to the opening which has been given to the valve $m$ and by avoiding opening too much the distribution and passing beyond the point of regulation.

3rd. Suppose the electric tension to increase (see Fig. 3) the solenoid $e$ attracts more forcibly its core $d$ which rises slightly with the valve rod, the liquid pressure arriving at $f$ then passes to $h$, as indicated by the arrow 5, acts to close the distribution of the motor and returns through the tubular connection $i$ and the outlet $j$ to flow away after having completed its work to diminish the speed of the motor. Nevertheless if the corresponding valve $l$ is slightly closed by turning the knob $n$, there is produced a small counter pressure which, by the pipe $p$ is transmitted to the upper part of the valve rod, as indicated by the arrow 6; this counter pressure slightly destroys the equilibrium of the valve rod and tends to cause it to descend by thus acting contrarily to the solenoid $e$; if this counterpressure becomes the stronger, the valve rod redescends under its action to the dead point and the liquid pressure escapes; by this fact the counterpressure becomes naught and the solenoid $e$ again attracts its core $d$; there are thus produced a series of intermissions effecting the regulation by taking count, as previously of the force of inertia of the masses in movement according to the opening left to the valve $l$ and by avoiding the too much closing of the distribution.

4th. Suppose the electric tension to be voluntarily or accidentally missing (see Fig. 4); the solenoid $e$ frees its core $d$ and consequently, the valve rod which descends to the bottom; in this position the liquid pressure arriving at $f$ then passes to $h$, acts to close the distribution of the motor and returns by the tubular connection $i$ and the outlet $j$ to flow away after having completed its work by arresting the motor which cannot race; the corresponding valve $l$ is slightly closed, being regulated as previously; there is then produced a small counterpressure which rises by the pipe $p$ and escapes through the said openings provided and without any action on the valve rod. The auxiliary action may be better obtained by placing in the current in derivation of the solenoid 18 (see Fig. 7) a small rheostat 19 (see Fig. 7) the proportional resistances of which to the losses in charge of the installation will increase with the opening of the distribution to proportion the normal tension to the delivery in the distributions of electric current.

One of the wires in derivation feeding the solenoid may pass to the various principal points of the installation and be provided with interrupters; by opening one of them, the current will not arrive at the solenoid and the regulator will close the distribution of the motor which will thus be arrested at will, even at a distance.

The arrangements above described are given as an example; the forms, dimensions and arrangements of detail may be varied according to circumstances without modifying the principle of the invention.

Claims.

1. In an electro-mechanical regulator, the combination of a solenoid, a movable core, a slide rod rigid with this core and carrying multiple valves, a box containing the slide rod and having a conduit, an admission pipe for fluid under pressure connected to said conduit, a servo-motor and two pipes connecting the servo-motor with the box.

2. In an electro-mechanical regulator, the combination of a solenoid, a movable core, a slide rod rigid with the core and carrying multiple valves, a box containing the slide rod an admission pipe for fluid under pressure, a pipe connecting said admission pipe to the box, a servo-motor and two pipes connecting the said motor with the box, said box having auxiliary exit openings of varying volume for the fluid under pressure.

3. In an electro-mechanical regulator, the combination of a solenoid, a rheostat placed in the circuit of the winding of the electric coil, a movable core, a slide rod rigid with this core and carrying multiple valves, a box containing the slide rod furnished with a conduit connected with an admission pipe of fluid under pressure and two conduits joined to a servo-motor.

4. In an electro-mechanical regulator, the combination of a solenoid, of a rheostat and interrupters placed in the circuit of the winding of the solenoid, a movable core, a slide rod rigid with this core and carrying multiple valves, a box containing the slide rod furnished with a conduit connected with an admission pipe of fluid under pressure and two conduits joined to a servo-motor.

The foregoing specification of my electro mechanical regulator of electric tension signed by me this 13th day of April 1906.

JOSEPH MICHEL CAMILLE HERRGOTT.

Witnesses:
HANSON C. COXE,
MAURICE H. PIGNET.